United States Patent
Sharpiro et al.

(10) Patent No.: US 9,280,761 B2
(45) Date of Patent: Mar. 8, 2016

(54) SYSTEMS AND METHODS FOR IMPROVED INTERACTIVE CONTENT SHARING IN VIDEO COMMUNICATION SYSTEMS

(75) Inventors: Ofer Sharpiro, Fair Lawn, NJ (US); Ran Sharon, Tenafly, NJ (US); Alexandros Eleftheriadis, Tenafly, NJ (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

(21) Appl. No.: 13/492,590

(22) Filed: Jun. 8, 2012

(65) Prior Publication Data

US 2012/0317483 A1  Dec. 13, 2012

Related U.S. Application Data

(60) Provisional application No. 60/494,697, filed on Jun. 8, 2011.

(51) Int. Cl.
*G06F 3/00* (2006.01)
*G06Q 10/10* (2012.01)
*H04N 7/15* (2006.01)
*H04L 29/06* (2006.01)
(Continued)

(52) U.S. Cl.
CPC .......... *G06Q 10/101* (2013.01); *H04L 12/1822* (2013.01); *H04L 65/103* (2013.01); *H04L 65/1093* (2013.01); *H04L 65/608* (2013.01); *H04L 65/80* (2013.01); *H04N 7/15* (2013.01); *G06F 3/0488* (2013.01)

(58) Field of Classification Search
CPC ....................................................... G06F 3/0488
USPC ................................................... 715/716, 753
See application file for complete search history.

(56) References Cited

U.S. PATENT DOCUMENTS

| 5,886,691 | A | 3/1999 | Furuya et al. |
| 6,809,749 | B1 | 10/2004 | Chen et al. |

(Continued)

FOREIGN PATENT DOCUMENTS

| EP | 1091582 A2 | 4/2001 |
| JP | 2001-202320 | 7/2001 |

(Continued)

OTHER PUBLICATIONS

International Search Report and Written Opinion for PCT/US2012/041695, dated Aug. 6, 2012 (Corresponds to U.S. Appl. No. 13/492,590).

(Continued)

*Primary Examiner* — William Titcomb
(74) *Attorney, Agent, or Firm* — Baker Botts, LLP

(57) ABSTRACT

Systems and methods for interactively sharing and annotating visual information over a communication network between at least a first and a second endpoint are disclosed. The system includes a display coupled to the first endpoint and a user interaction device coupled to the first endpoint and associated with the display, wherein the first endpoint is configured to: receive visual information from, and transmit visual information to, at least the second endpoint over the communication network; show visual information received from at least the second endpoint on the display; obtain a copy of the visual information shown on the display when instructed by the user interaction device; add an annotation, if any, as indicated by the user interaction device; and transmit the annotated copy to the second endpoint.

10 Claims, 12 Drawing Sheets

(51) Int. Cl.
*H04L 12/18* (2006.01)
*G06F 3/0488* (2013.01)

(56) References Cited

U.S. PATENT DOCUMENTS

| | | | |
|---|---|---|---|
| 7,219,072 B1 | 5/2007 | Sundaresan | |
| 7,593,032 B2 * | 9/2009 | Civanlar | H04N 7/152 348/14.09 |
| 8,140,980 B2 * | 3/2012 | Gunasekar | G06F 17/289 715/753 |
| 8,144,186 B2 * | 3/2012 | Wagner | 348/14.09 |
| 8,228,363 B2 * | 7/2012 | Halavy | 348/14.09 |
| 8,340,268 B2 * | 12/2012 | Knaz | 379/202.01 |
| 8,340,271 B2 * | 12/2012 | Knaz | 379/211.02 |
| 8,340,272 B2 * | 12/2012 | Knaz | 379/211.02 |
| 8,428,234 B2 * | 4/2013 | Knaz | 379/201.01 |
| 8,446,454 B2 * | 5/2013 | Decker et al. | 348/14.09 |
| 8,502,857 B2 * | 8/2013 | Halavy | 348/14.03 |
| 9,055,312 B2 * | 6/2015 | Civanlar | H04N 7/15 |
| 2003/0174202 A1 | 9/2003 | Eshkoli et al. | |
| 2004/0002049 A1 | 1/2004 | Beavers et al. | |
| 2004/0226047 A1 | 11/2004 | Lin et al. | |
| 2005/0021645 A1 | 1/2005 | Kulkarni et al. | |
| 2005/0034079 A1 | 2/2005 | Gunasekar et al. | |
| 2005/0210393 A1 | 9/2005 | Maeng | |
| 2005/0289471 A1 | 12/2005 | Thompson et al. | |
| 2006/0009243 A1 | 1/2006 | Dahan et al. | |
| 2006/0123082 A1 | 6/2006 | Digate et al. | |
| 2006/0277255 A1 | 12/2006 | Orsolini et al. | |
| 2008/0052377 A1 | 2/2008 | Light | |
| 2009/0132583 A1 | 5/2009 | Carter et al. | |
| 2009/0285131 A1 * | 11/2009 | Knaz | 370/260 |
| 2010/0138450 A1 | 6/2010 | Fishman et al. | |
| 2010/0180211 A1 | 7/2010 | Boyd | |
| 2010/0194847 A1 * | 8/2010 | Halavy | 348/14.09 |
| 2010/0328422 A1 * | 12/2010 | Harel et al. | 348/14.09 |
| 2011/0047485 A1 | 2/2011 | Takakura | |
| 2011/0093548 A1 | 4/2011 | Das et al. | |
| 2011/0191692 A1 | 8/2011 | Walsh et al. | |
| 2012/0147130 A1 * | 6/2012 | Wagner | 348/14.09 |
| 2012/0206563 A1 * | 8/2012 | Harel et al. | 348/14.09 |
| 2012/0274725 A1 | 11/2012 | Robertson et al. | |
| 2013/0093835 A1 * | 4/2013 | Paithankar et al. | 348/14.07 |
| 2013/0210401 A1 * | 8/2013 | Knaz | 455/416 |
| 2013/0222529 A1 * | 8/2013 | Decker et al. | 348/14.09 |

FOREIGN PATENT DOCUMENTS

| | | |
|---|---|---|
| JP | 2003-532223 | 10/2003 |
| JP | 2003-323387 A | 11/2003 |
| JP | 2003-324705 | 11/2003 |
| JP | 2005-109929 | 4/2005 |
| JP | 2006-148425 | 6/2006 |
| JP | 2007-516674 | 6/2007 |
| JP | 2007-189689 | 7/2007 |
| JP | 2007-534266 | 11/2007 |
| JP | 2009-043201 | 2/2009 |
| JP | 2011-044877 | 3/2011 |
| JP | 2012-531637 | 12/2012 |
| WO | WO 01/84328 A1 | 11/2001 |
| WO | WO 2007/067990 | 6/2007 |
| WO | WO 2007/076486 | 7/2007 |
| WO | WO 2007/103889 | 9/2007 |
| WO | WO 2008/086423 | 7/2008 |
| WO | WO 2009/114556 | 9/2009 |
| WO | WO 2011/000284 A1 | 1/2011 |
| WO | WO 2011/038003 | 3/2011 |

OTHER PUBLICATIONS

International Search Report and Written Opinion for PCT/US2013/059313, dated Mar. 27, 2014.
International Search Report and Written Opinion for PCT/US2010/058801, dated Jan. 24, 2011.
International Search Report and Written Opinion for PCT/US2013/074993, dated May 27, 2014.
European Search Report dated Jan. 29, 2015 in EP Patent Application No. 12797452.
Japanese Office Action mailed Mar. 2, 2015 in JP Patent Application No. 2014-514901.

* cited by examiner

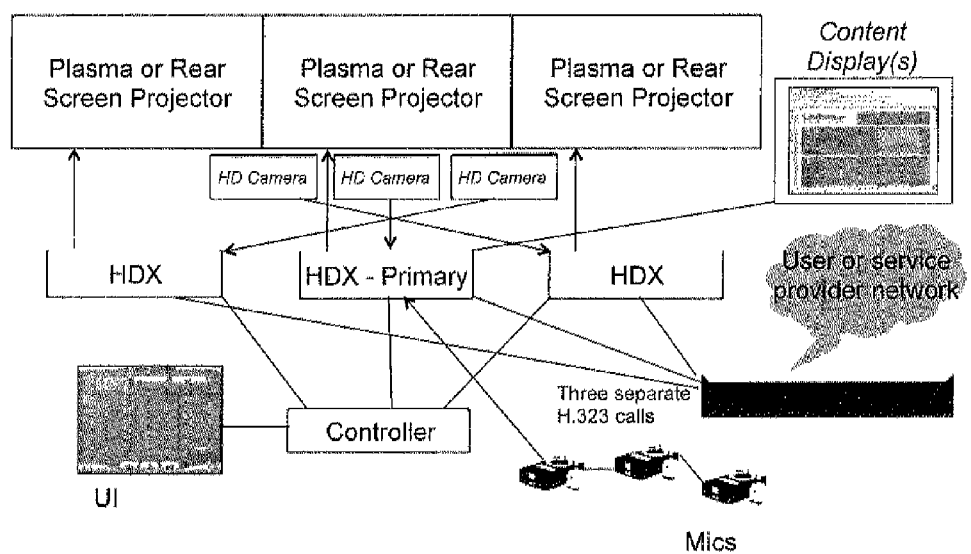
FIG. 1: Example commercial telepresence system architecture (prior art)

FIG. 2: SVCS system architecture
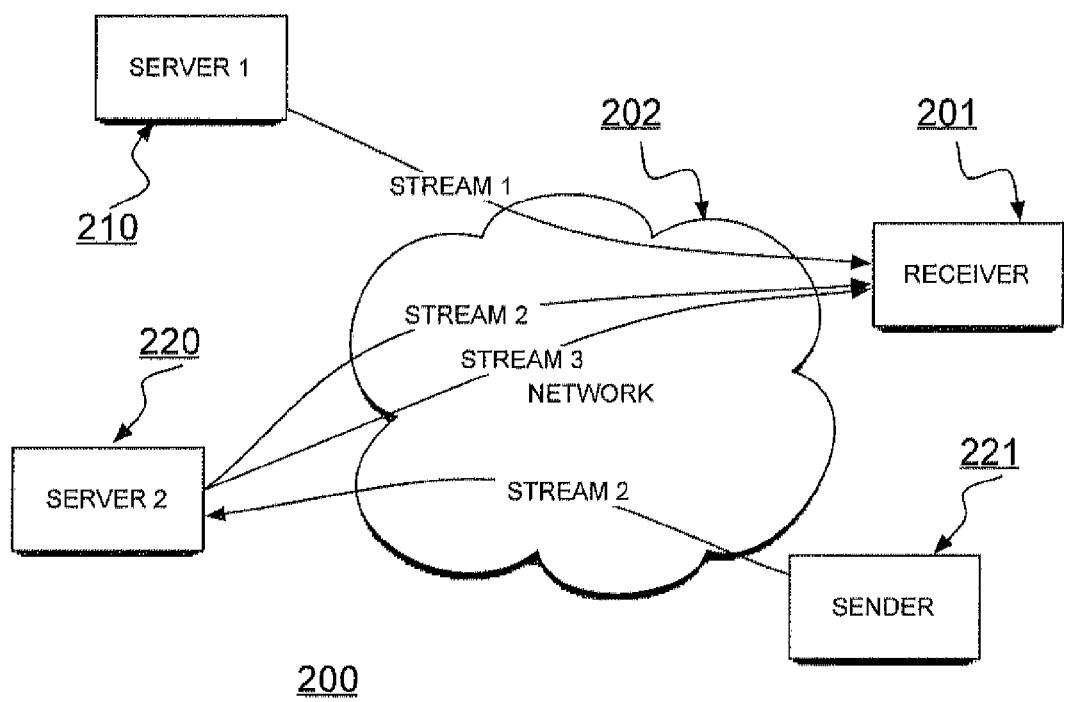

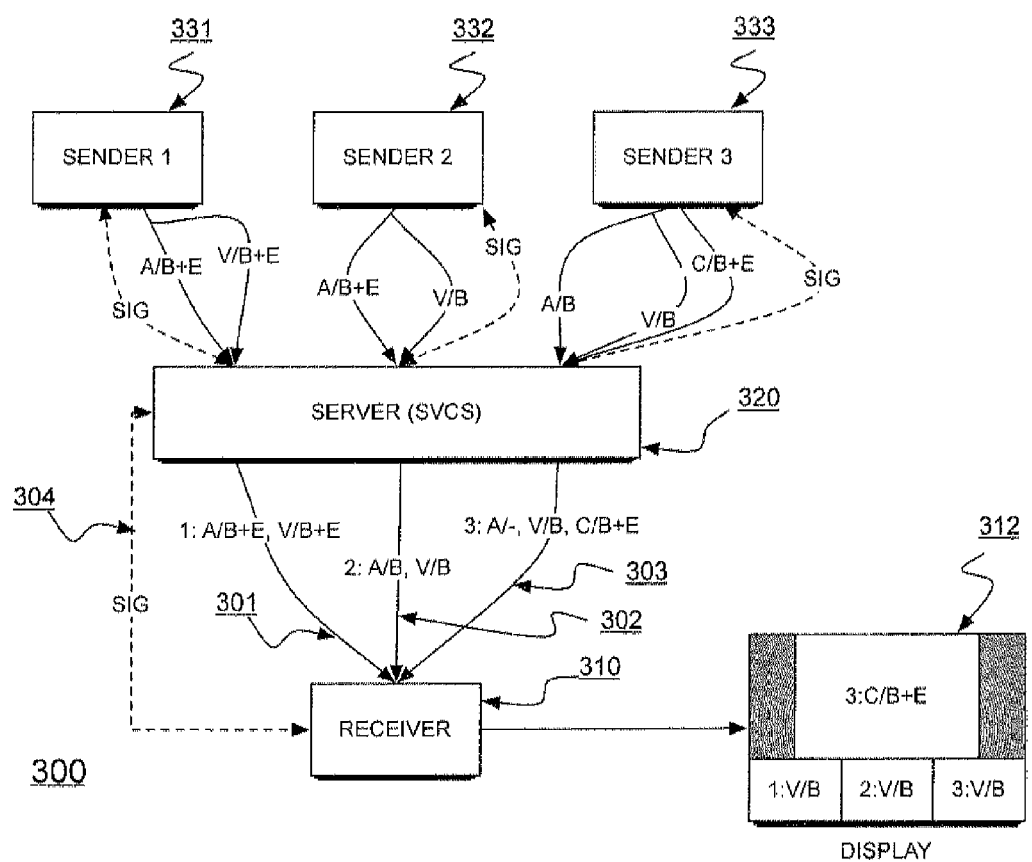
FIG. 3: SVCS System Operation

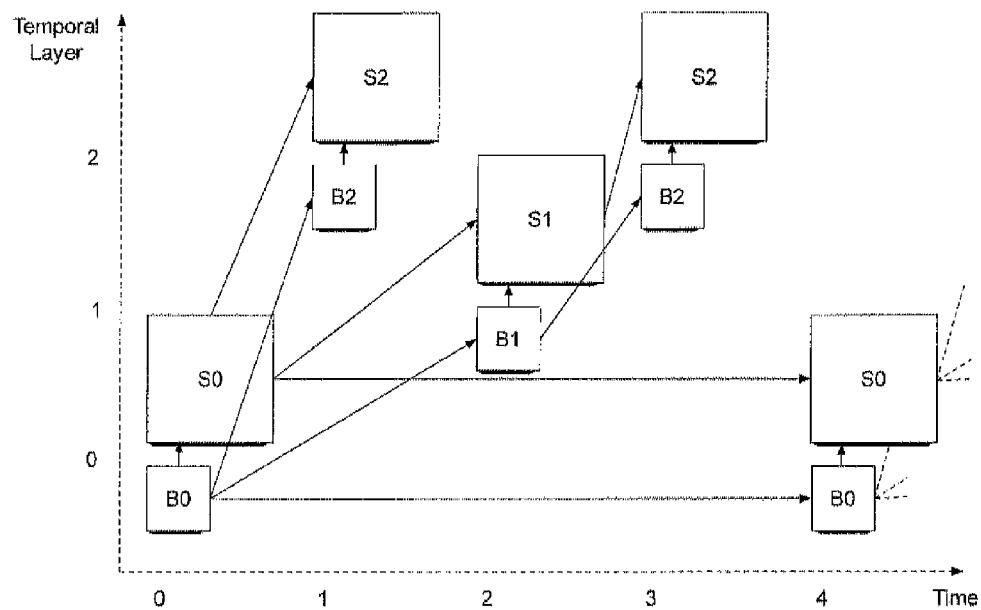
FIG. 4: Spatial and temporal prediction coding Structure for SVC encoding

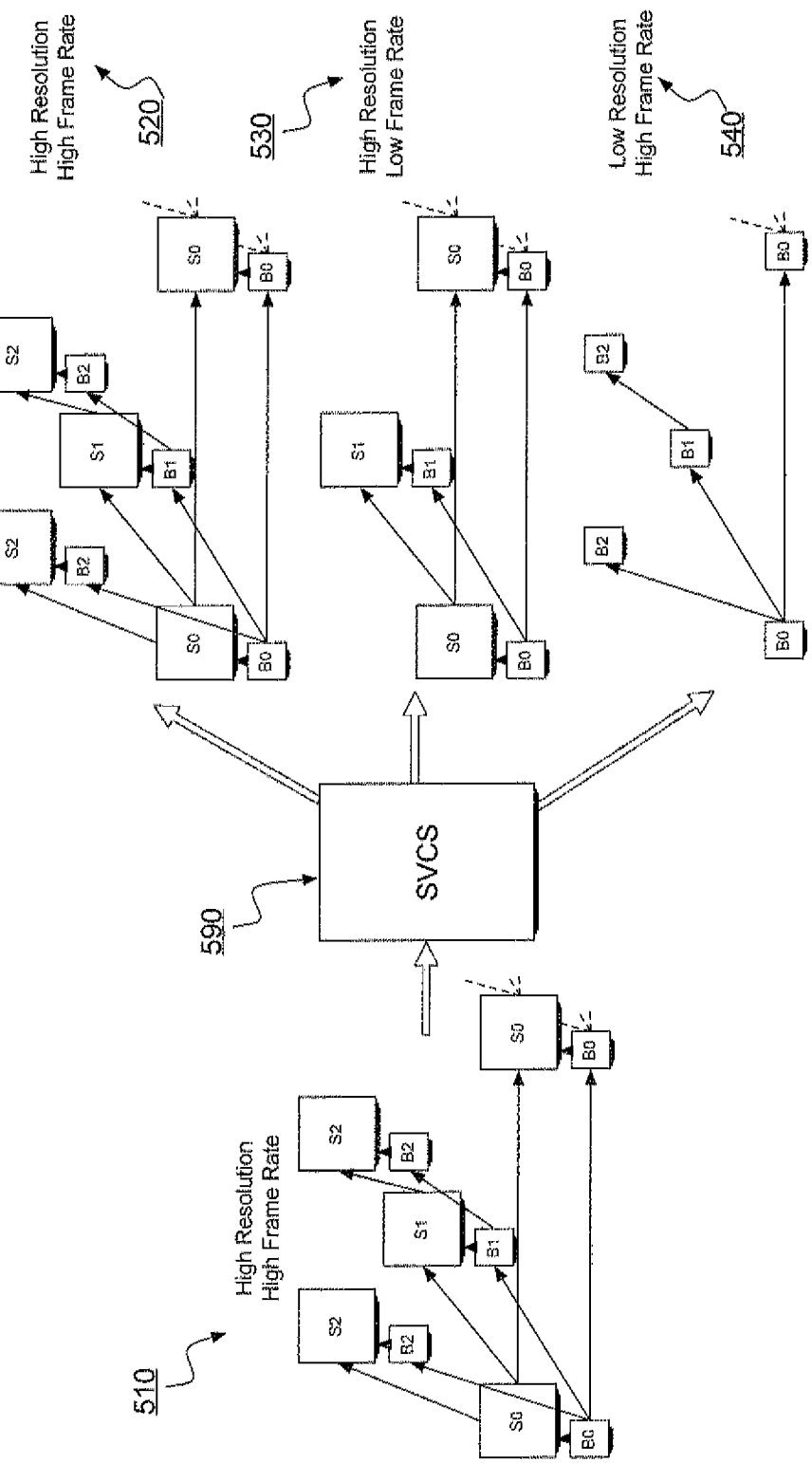

FIG. 6: Docking, undocking, and selection of content window
(a)
SHARE SELECTION MENU BUTTON
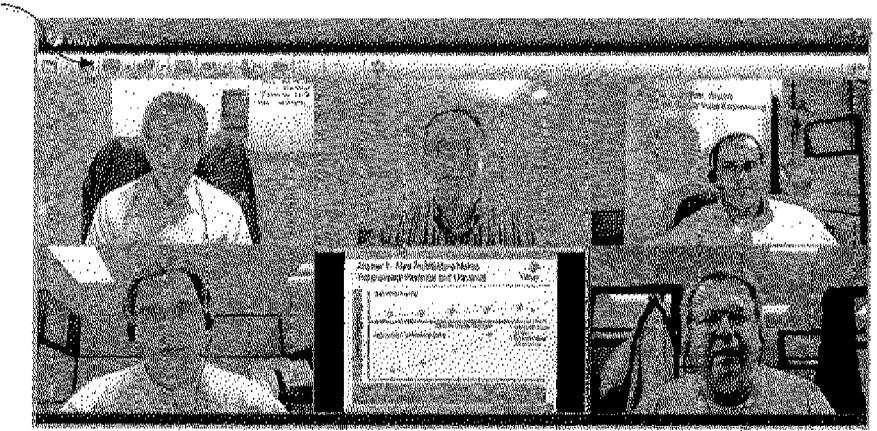
(b)
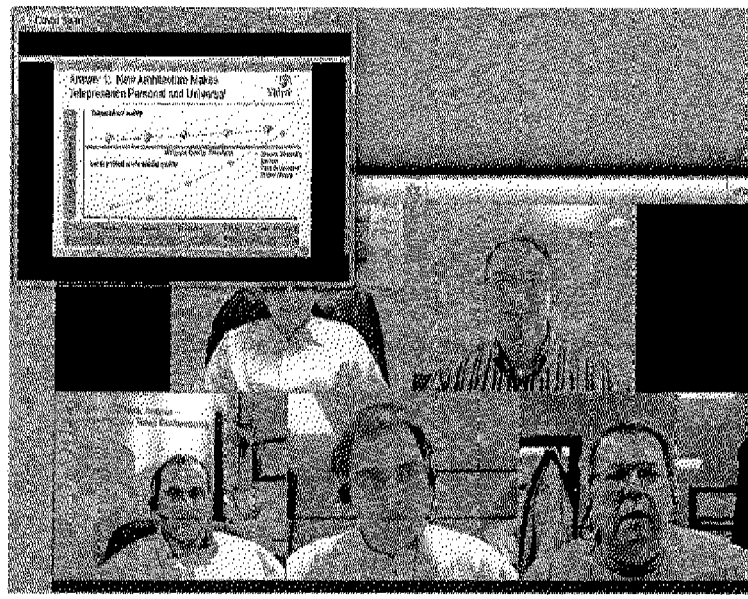
(c)

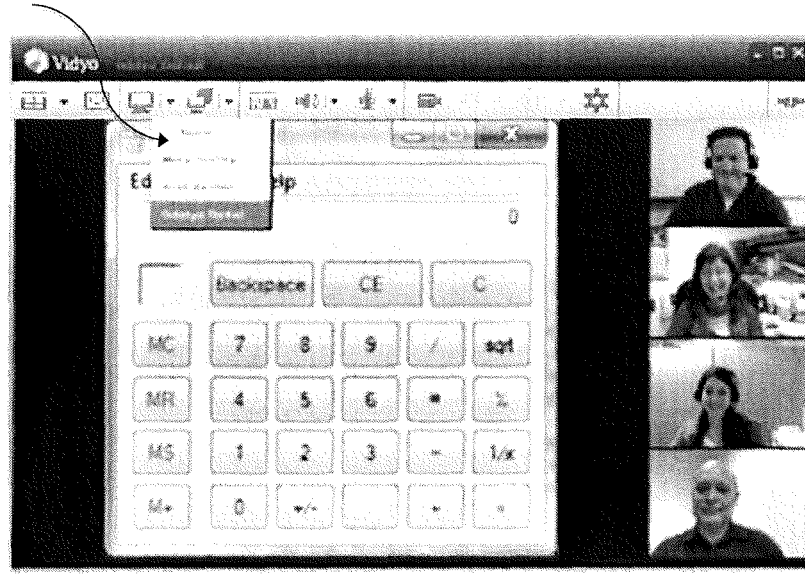
(d)
FIG. 6 (CON'T)

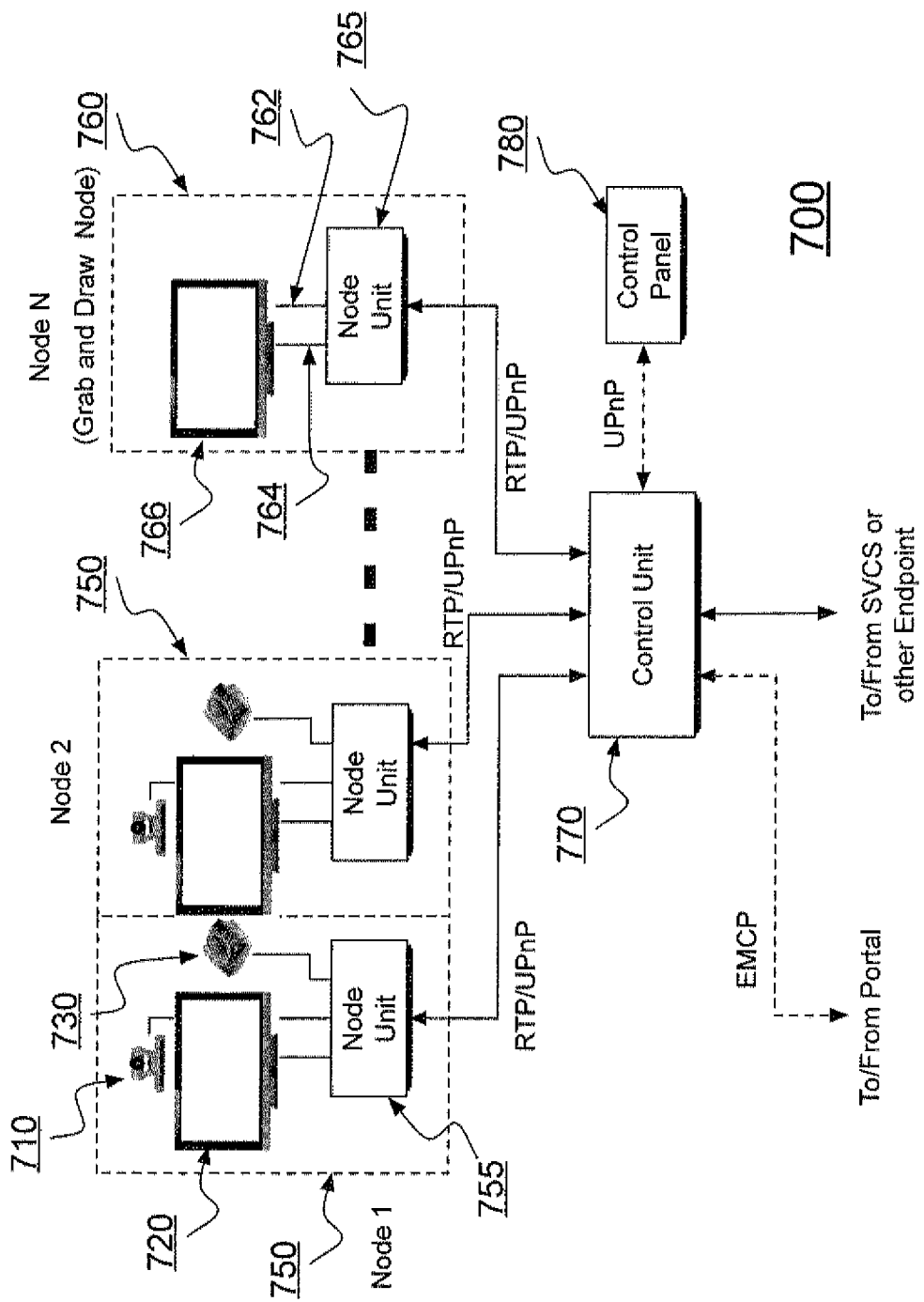
FIG. 7: Endpoint architecture with interactive content sharing node unit

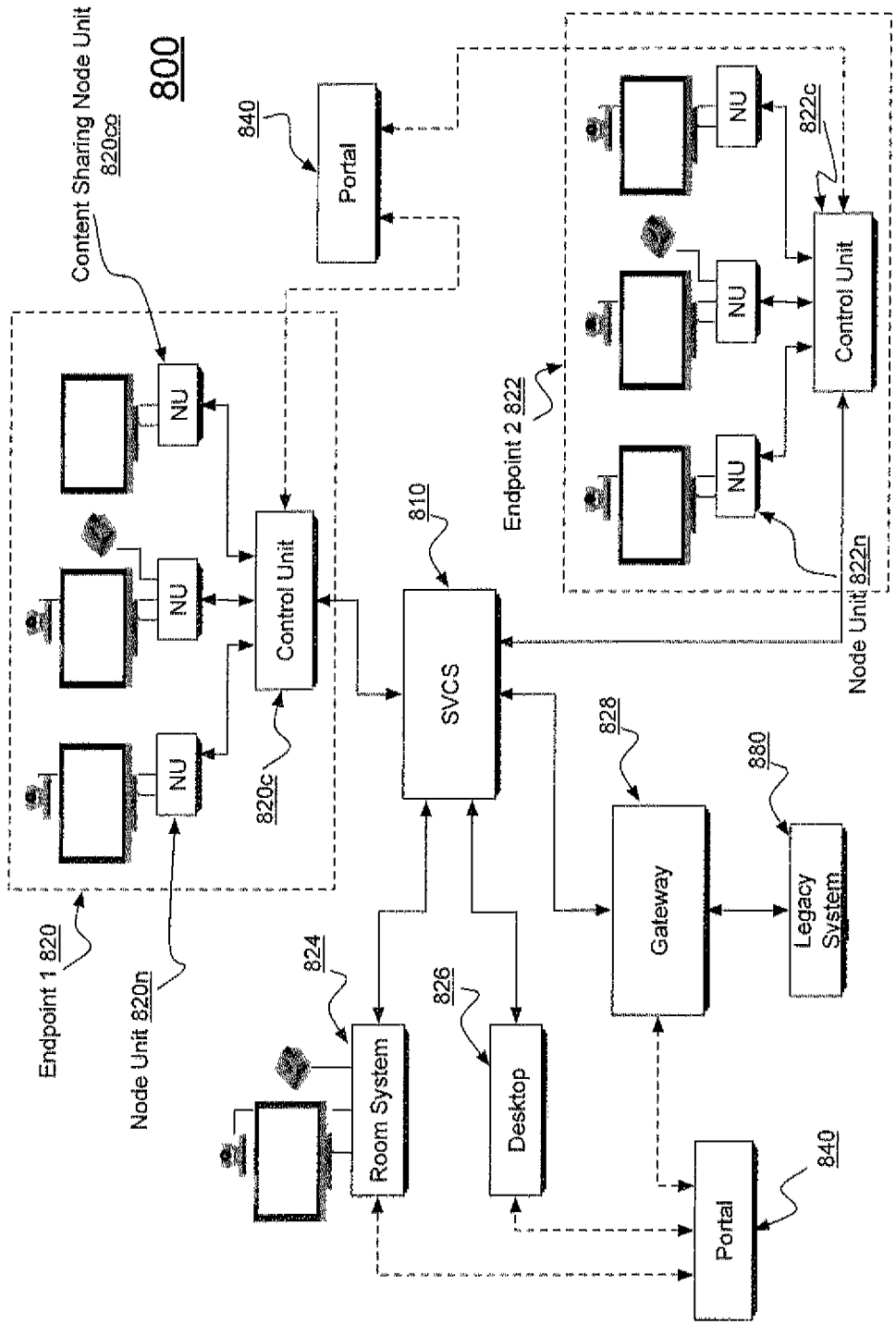
FIG. 8: Exemplary system with interactive content sharing

FIG. 9: Process of "grabbing", "drawing", and sharing
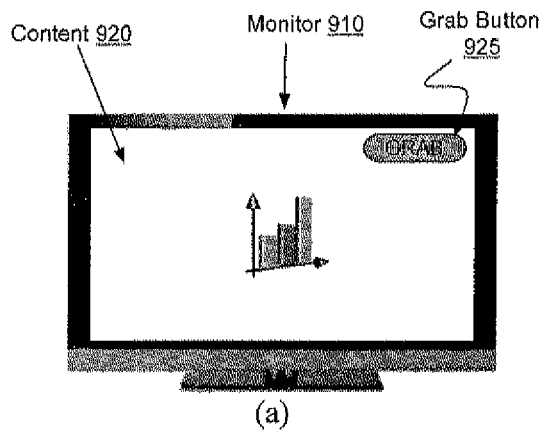
(a)
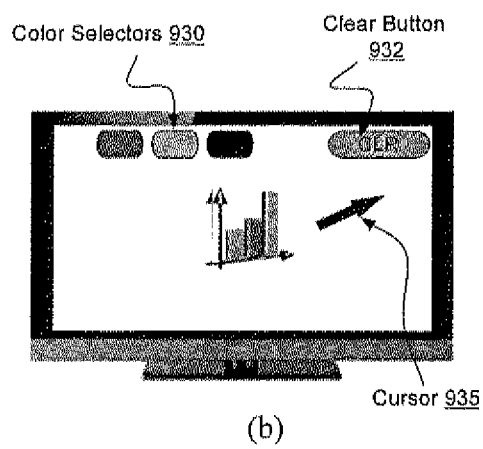
(b)
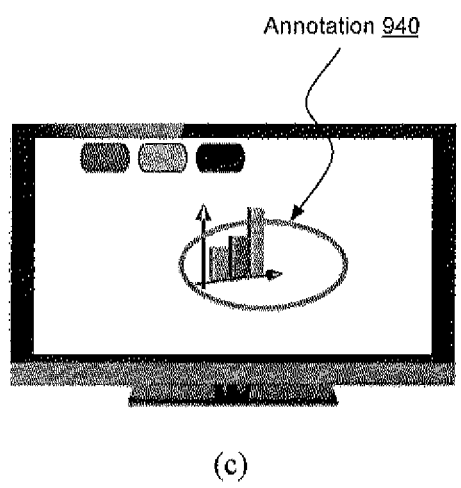
(c)

(d)

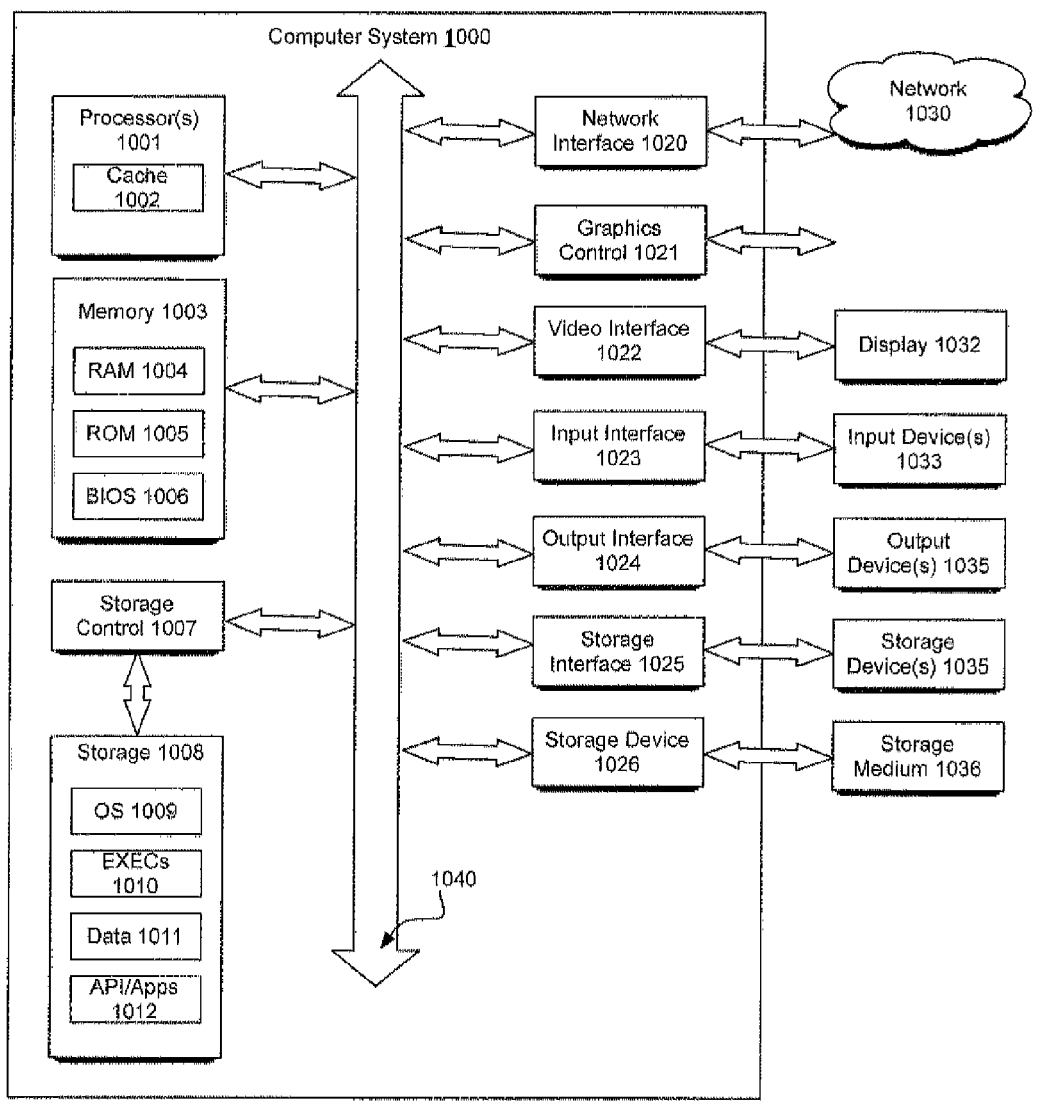
FIG. 10: Computer system

SYSTEMS AND METHODS FOR IMPROVED INTERACTIVE CONTENT SHARING IN VIDEO COMMUNICATION SYSTEMS

CROSS-REFERENCE TO RELATED APPLICATIONS

This application claims priority to U.S. Provisional Application Ser. No. 61/494,697, filed Jun. 8, 2011, which is incorporated by reference herein in its entirety.

FIELD

The disclosed subject matter relates to video communication systems that allow content sharing, such as the contents of a computer's screen, or of a window of an application, or of the output of any imaging device.

BACKGROUND

Certain video communication applications allow the sharing of "content". The word can refer to any visual content that is not the video stream of one of the participants. Examples include the contents of a computer's screen—either the entire screen ("desktop") or a portion thereof or of a window where one of the computer's applications may be displaying its output.

Some systems used a "document camera" to capture such content. This camera would be positioned so that it would image a document placed on a table or special flatbed holder, and would capture an image of the document for distribution to all session participants. In modern systems, where computers are the primary business communication tool, the document camera is replaced with a VGA input, so that any VGA video-producing device can be connected. In advanced systems, the computer can directly interface with the video communication system so that it directly transmits the relevant content material to the session, without the need for conversion to VGA or other intermediate analog or digital format.

On one end of the spectrum, content sharing may be completely passive ("passive content sharing"). In this scenario the video communication system will only encode and transmit the content to the participants, without providing the capability to modify it in any way. When content is driven by a computer, e.g., sharing a page of a document, it may be possible to show the cursor as well as any highlighting that is applied by the underlying software. This, however, is captured as imagery—it is not possible, in other words, for a remote participant to "take over" the cursor and perform remote editing of the document. This is the mode used in many video communication applications.

On the other end of the spectrum there are distributed collaboration applications, such as shared whiteboards, and sometimes referred to as "active content sharing." In this scenario, users are able to collaboratively edit and view a document in a synchronized fashion. The complexity in building such systems is significant, and requires specialized protocols and applications. Oftentimes, users are not able to use their favorite applications and are forced to use special, network-aware, programs (typically of lower sophistication). Thus, video communication applications can be using passive content sharing rather than active.

Certain video communication systems that rely on the Multipoint Control Unit (MCU) architecture, such as those using the ITU-T Rec. H.323 standard, "Packet-based multimedia communications systems," incorporated herein by reference in its entirety, also can support a single content stream. ITU-T Rec. H.239, "Role management and additional media channels for H.3xx-series terminals", incorporated herein by reference in its entirety, defines mechanisms through which two video channels can be supported in a single H.323 session or call. The first channel is used to carry the video of the participants, and the second to carry a PC graphics presentation or video. For presentations in multipoint conferencing, H.239 defines token procedures to guarantee that only one endpoint in the conference sends the additional video channel which is then distributed to all conference participants.

When an H.323 call is connected, signaling defined in ITU-T Rec. H.245 can be used to establish the set of capabilities for all connected endpoints and MCUs. When the set of capabilities includes an indication that H.239 presentations are supported, a connected endpoint can choose to open an additional video channel. First the endpoint has to request a token from the MCU. The MCU can then check if there is another endpoint currently sending an additional video channel. The MCU will use token messages to make this endpoint stop sending the additional video channel. Then the MCU will acknowledge the token request from the first endpoint which then can begin to send the additional video channel which, as an example, may contain encoded video from a computer's video output at XGA resolution. Similar procedures can be defined for the case when two endpoints are directly connected to each other without an intermediate MCU.

Certain video communication systems used for traditional videoconferencing involve a single camera and a single display for each of the endpoints. High-end systems for use in dedicated conferencing rooms, may feature multiple monitors. The $2^{nd}$ monitor is often dedicated to content sharing. When no such content is used, one monitor may feature the loudest speaker whereas the other monitor shows some or all of the remaining participants. When only one monitor is available, then either content has to be switched between video, or the screen must be split between the two.

Video communication systems that run on personal computers (or tablets or other general-purpose computing devices) typically have more flexibility in terms of how they display both video and content, and can also become sources of content sharing. Indeed, any portion of the computer's screen can be indicated as source for content and be encoded for transmission without any knowledge of the underlying software application ("screen dumping", as allowed by the display device driver and operating system software). Inherent system architecture limitations, such as with H.300-series specifications, where only two streams (one video and one content) are allowed, may prohibit otherwise viable operating scenarios (multiple video streams and multiple content streams).

So-called "telepresence" can convey the sense of "being in the same room" as the remote participant(s). In order to accomplish this goal, these systems can utilize multiple cameras as well as multiple displays. The displays and cameras are positioned at carefully calculated positions in order to be able to give a sense of eye-contact. Some systems involve three displays—left, center, and right—although configurations with only two or more than three displays are also available.

The displays can be situated in carefully selected positions in the conferencing room. Looking at each of the displays from any physical position on the conferencing room table is supposed to give the illusion that the remote participant is physically located in the room. This can be accomplished by matching the exact size of the person as displayed to the expected physical size that the subject would have if he or she were actually present in the perceived position within the room. Some systems go as far as matching the furniture, room colors, and lighting, to further enhance the life-like experience.

In order to be effective, telepresence systems should offer very high resolution and operate with very low latency. For example, these systems can operate at high definition (HD) 1080p/30 resolutions, i.e., 1080 horizontal lines progressive at 30 frames per second. To eliminate latency and packet loss, they also use dedicated multi-megabit networks and typically operate in point-to-point or switched configurations (i.e., they avoid transcoding).

Some video conferencing systems assume that each endpoint is equipped with a single camera, although they can be equipped with several displays.

For example, in a two-monitor system, the active speaker can be displayed in the primary monitor, with the other participants shown in the second monitor in a matrix of smaller windows. One matrix layout, referred to as "continuous presence", permits participants to be continuously present on the screen rather than being switched in and out depending on who is the active speaker. In sessions with a large number of participants, when the size of the matrix is exhausted (e.g., 9 windows for a 3×3 matrix) then participants can be entered and removed from the continuous presence matrix based on least-recently active audio policy. The layout is still referred to as "continuous presence" in this case as well.

A similar configuration to the continuous presence layout is the preferred speaker layout, where one (or a small set of speakers) is designated as the preferred one and is shown in a larger window than the other participants (e.g., double the size).

An alternative way is to use the second monitor to display content (e.g., a slide presentation from a computer) and the primary monitor to show the participants. The primary monitor then is treated as with a single-monitor system. The primary monitor can feature a preferred speaker layout as well. In this case, the preferred speaker is shown in larger size in the primary monitor, together with a number of other participants in smaller sizes, whereas content is shown in the second monitor.

Telepresence systems that feature multiple cameras can be designed so that each camera is assigned to its own codec. A system with three cameras and three screens would then use three separate codecs to perform encoding and decoding at each endpoint. These codecs would make connections to three counterpart codecs on the remote site, using proprietary signaling or proprietary signaling extensions to existing protocols.

The three codecs are typically identified as "left," "right," and "center." In this document such positional references are made from the perspective of a user of the system; left, in this context, is the left-hand side of a user that is sitting in front of the camera(s) and is using the system. Audio, e.g., stereo, and can be handled through the center codec. In addition to the three video screens, telepresence systems can include a fourth screen to display computer-related content such as presentations. This can be referred to as the "content" or "data" stream.

FIG. 1 depicts the architecture of a commercially available legacy telepresence system (the Polycom TPX 306M). The system features three screens (plasma or rear screen projection) and three HD cameras. Each HD camera is paired with a codec which is provided by an HDX traditional (single-stream) videoconferencing system. One of the codecs is labeled as Primary. Notice the diagonal pairing of the HD cameras with the codecs. This is so that the correct viewpoint is offered to the viewer on the remote site.

The Primary codec is responsible for audio handling. The system here is shown as having multiple microphones, which are mixed into a single signal that is encoded by the primary codec. There is also a fourth screen to display content. The entire system is managed by a special device labeled as the Controller. In order to establish a connection with a remote site, this system performs three separate H.323 calls, one for each codec. This is because existing ITU-T standards do not allow the establishment of multi-camera calls. This architecture is typical of certain telepresence products that use standards-based signaling for session establishment and control. Use of the TIP protocol would allow system operation with a single connection, and would make possible up to 4 video streams and 4 audio streams to be carried over two RTP sessions (one for audio and one for video).

Referring to FIG. 1 content is handled by the Primary codec (notice that the Content display is connected to the Primary codec). The Primary codec will use H.239 signaling to manage the content display. A legacy, non-telepresence, two-monitor system is configured essentially in the same way as the Primary codec of a telepresence system.

Telepresence systems pose unique challenges compared with traditional videoconferencing systems. One challenge is that such systems be able to handle multiple video streams. A typical videoconferencing system only handles a single video stream, and optionally an additional "data" stream for content. Even when multiple participants are present, the Multipoint Control Unit (MCU) is responsible for compositing the multiple participants in a single frame and transmitting the encoded frame to the receiving endpoint. Certain systems address this in different ways. One way is to establish as many connections as there are video cameras, e.g., for a three camera systems, three separate connections are established, and mechanisms are provided to properly treat these separate streams as a unit, i.e., as coming from the same location.

A second way is to use extensions to existing signaling protocols, or use new protocols, such as the Telepresence Interoperability Protocol (TIP). TIP is currently managed by the International Multimedia Telecommunications Consortium (IMTC); the specification can be obtained from IMTC at the address 2400 Camino Ramon, Suite 375, San Ramon, Calif. 94583, USA or from the web site http://www.imtc.org/tip. TIP allows multiple audio and video streams to be transported over a single RTP (Real-Time Protocol, RFC 3550) connection. TIP enables the multiplexing of up to four video or audio streams in the same RTP session, using proprietary RTCP (Real-Time Control Protocol, defined in RFC 3550 as part of RTP) messages. The four video streams can be used for up to three video streams and one content stream.

In both traditional as well as telepresence system configurations, content handling is thus simplistic. There are inherent limitations of the MCU architecture, in both its switching and transcoding configurations. The transcoding configuration introduces delay due to cascaded decoding and encoding, in addition to quality loss, and is thus problematic for a high-quality experience. Switching, on the other hand, can become awkward, such as when used between systems with a different number of screens.

Scalable video coding ('SVC'), an extension of the well-known video coding standard H.264 that is used in certain digital video applications, is a video coding technique that has proven to be effective in interactive video communication. The bitstream syntax and decoding process are formally specified in ITU-T Recommendation H.264, and particularly Annex G. ITU-T Rec. H.264, incorporated herein by reference in its entirety, can be obtained from the International telecommunications Union, Place de Nations, 1120 Geneva, Switzerland, or from the web site www.itu.int. The packetization of SVC for transport over RTP is defined in RFC 6190, "RTP payload format for Scalable Video Coding," incorporated herein by reference in its entirety, which is available from the Internet Engineering Task Force (IETF) at the web site http://www.ietf.org.

Scalable video and audio coding has been used in video and audio communication using the so-called Scalable Video Coding Server (SVCS) architecture. The SVCS is a type of video and audio communication server and is described in commonly assigned U.S. Pat. No. 7,593,032, "System and Method for a Conference Server Architecture for Low Delay and Distributed Conferencing Applications", as well as commonly assigned International Patent Application No. PCT/US06/62569, "System and Method for Videoconferencing using Scalable Video Coding and Compositing Scalable Video Servers," both incorporated herein by reference in their entirety. It provides an architecture that allows for high quality video communication with high robustness and low delay.

Commonly assigned International Patent Application Nos. PCT/US06/061815, "Systems and methods for error resilience and random access in video communication systems," PCT/US07/63335, "System and method for providing error resilience, random access, and rate control in scalable video communications," and PCT/US08/50640, "Improved systems and methods for error resilience in video communication systems," all incorporated herein by reference in their entirety, further describe mechanisms through which a number of features such as error resilience and rate control are provided through the use of the SVCS architecture.

In one example, the SVCS operation includes receiving scalable video from a transmitting endpoint and selectively forwarding layers of that video to the receiving participant(s). In a multipoint configuration, and contrary to an MCU, this exemplary SVCS performs no decoding/composition/re-encoding. Instead, all appropriate layers from all video streams can be sent to each receiving endpoint by the SVCS, and each receiving endpoint is itself responsible for performing the composition for final display. Note that this means that, in the SVCS system architecture, all endpoints can have multiple stream support, because the video from each transmitting endpoint is transmitted as a separate stream to the receiving endpoint(s). Of course, the different streams can be transmitted over the same RTP session (i.e., multiplexed), but the endpoint should be configured to receive multiple video streams, decode, and compose them for display. This is an important advantage for SVC/SVCS-based systems in terms of the flexibility of handling multiple streams.

In systems that use the SVC/SVCS architecture, content sharing can work as follows. The user interface of the endpoint application which runs on a personal computer can allow the user to select any existing application window for sharing with the other participants. When such a window is selected, it can appear in the list of available "shares" in the user interface of the other users. To alert them to the new share if no share is currently shown in their window, the newly introduced share can be shown in a "preferred view" (i.e., larger size view) in the main application window together with the videos of the session participants (i.e., the same way as a video participant). Since the size of this view may be small, and at any rate smaller than the size of the typical application window, the user can double-click on it so that it "pops-out" into its own window and thus allow the user to freely resize it. In a room-based system with two monitors the content can be shown in its own monitor; if only one monitor is available then the screen can be split between video windows and the content window.

When the shared content is viewed by one or more of the participants, the originating endpoint can encode and transmit the content in the same way that it does any other source of video. Of course, the video encoding and decoding may be different in order to accommodate the particular features of computer-generated imagery, but from a system perspective the content stream is treated as any other video stream. Note that the same video encoder can be used for content as well, but with different tuning and optimization settings (e.g., lower frame rate, higher spatial resolution with finer quantization, etc.). The system can support multiple content shares per endpoint. Although it may be confusing for the end-user to have multiple active content shares, the system architecture can support it. The inherent multi-stream support of the SVCS architecture makes content handling a natural extension of video.

Commonly assigned International Patent Application No. PCT/US11/038003, "Systems and Methods for Scalable Video Communication using Multiple Cameras and Multiple Monitors," incorporated herein by reference in its entirety, describes systems and methods for video communication using scalable video coding with multiple cameras and multiple monitors. In this case the architecture is expanded to include multiple video displays and possibly multiple sources for a particulate endpoint.

It can be desirable to improve the way content is handled, so that users can have improved interaction with the content without adversely increasing the complexity of the implementation or radically changing the underlying system architecture.

SUMMARY

Systems and methods for interactive content sharing in video communication systems are disclosed herein. In one embodiment of the present invention, a user at an endpoint can capture a particular picture or video or shared content, and initiate a content share of his own. In another embodiment, the user can also annotate the captured picture using appropriate software on his or her own endpoint, such that the annotated captured picture is shared with other session participants. In yet another embodiment, the annotation software can allow the end user to save different versions of the annotated picture, and select which one is shared with the other session participants. In another embodiment, the triggering of the interactive share can be the detection of a user in front of the content screen or whiteboard.

BRIEF DESCRIPTION OF THE DRAWINGS

FIG. 1 illustrates the architecture of an exemplary commercial telepresence system (prior art);

FIG. 2 illustrates the architecture of an exemplary audio and video communication system that uses scalable video (and audio) coding in accordance with one or more embodiments of the disclosed subject matter;

FIG. 3 depicts the architecture and operation of an exemplary SVCS system in accordance with one or more embodiments of the disclosed subject matter;

FIG. 4 depicts an exemplary spatial and temporal prediction coding structure for SVC encoding in accordance with one or more embodiments of the disclosed subject matter;

FIG. 5 depicts exemplary SVCS handling of spatiotemporal layers of scalable video in accordance with one or more embodiments of the disclosed subject matter;

FIG. 6 depicts the user interface associated with docking, undocking, and selection of content windows, in accordance with one or more embodiments of the disclosed subject matter;

FIG. 7 depicts the architecture of an endpoint with an interactive content sharing node unit, in accordance with one or more embodiments of the disclosed subject matter;

FIG. 8 depicts an exemplary interactive content sharing system in accordance with one or more embodiments of the disclosed subject matter;

FIG. 10 depicts an exemplary computer system for implementing one or more embodiments of the disclosed subject matter.

Figure 9:
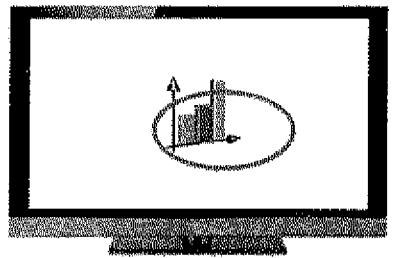
FIG. 9 depicts the process of "grabbing," "drawing," and sharing, in accordance with one or more embodiments of the disclosed subject matter.

Throughout the figures the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

The present disclosure describes a collaboration system. In one exemplary embodiment of the present disclosure the collaboration system is integrated with a video communication system which uses H.264 SVC and is based on the concept of the SVCS (see U.S. Pat. No. 7,593,032, previously cited). The same collaboration system, however, can be used in legacy systems, including telepresence systems.

FIG. 2 depicts an exemplary system architecture 200 of an SVCS system where one or more servers can provide video and audio streams to a Receiver 201 over a Network 202 according to an exemplary embodiment. FIG. 2 shows two such servers, with Server 1 210 providing Stream 1, and Server 2 220 providing two streams, Stream 2 and Stream 3. Server 1 210 and Server 2 220 can be Scalable Video Communication Server (SVCS) systems and/or Scalable Audio Communication Server (SACS) systems, which forward data received from other participants (such as Sender 221) to the receiver, or they can be stand-alone media servers (e.g., accessing content from storage). It is noted that "participants" here can also be transmitting-only systems, such as units that perform encoding only (e.g., a system that encodes and transmits a live TV signal). Although the diagram shows a separate Sender and a Receiver, the system can be performing both roles at the same time, i.e., they can be both transmitting and receiving information.

One embodiment of the disclosed subject matter uses the well-known, commercially-available H.264 standard for encoding the video signals and the Speex scalable codec for audio Speex is an open-source audio compression format; a specification is available at the Speex web site at http://www.speex.org. Some of the streams can be encoded using single-layer AVC, whereas some others can be encoded using its scalable extension SVC. Similarly, some of the Speex audio streams can contain only narrowband data (8 KHz), whereas others can contain narrowband as well as, or separately, wideband (16 KHz) or ultra-wideband (32 KHz) audio. Alternate scalable codecs may be used, such as MPEG-4/Part 2 or H.263++ for video, or G.729.1 (EV) for audio. The Network 202 can be any packet-based network; e.g., an IP-based network, such as the Internet.

In an exemplary embodiment, the Receiver 201 and Sender 221 is a general-purpose computer such as PC or Apple computer, desktop, laptop, tablet, etc. running a software application. They can also be dedicated computers engineered to only run the single software application, for example using embedded versions of commercial operating systems, or even standalone devices engineered to perform the functions of the receiving and sending application, respectively. The receiving software application can be responsible for communicating with the server(s) for establishing connections as well as receiving, decoding, and displaying or playing back received video, content, and/or audio streams. The sending application, or the same receiving application for systems that are both senders and receiver, can also be transmitting back to a server its own encoded video, content, and/or audio stream.

Transmitted streams can be the result of real-time encoding of the output of a camera and microphone attached to Sender 221, or they can be pre-coded video and audio stored locally on the Sender 221 or on a file server accessible from the Sender 221 over the Network 202 or directly attached to it. For content streams, the source material can be obtained directly from a compute screen, through an intermediate analog or digital format (e.g., VGA), or it can be produced by a document or other camera. Other means of obtaining visual content are also possible as persons skilled in the art will recognize.

In one embodiment, the Sender 221 is equipped with a connected camera and microphone, and encodes and transmits the produced video and audio signal to other participants via a Server 2 220 over a Stream 2. The Sender 221 also produces one or more content streams that are similarly transmitted to the Server 220 over the same Stream 2. Although one server is shown to exist in the path from a Sender to a Receiver, it is possible that more than one servers may exist. Also, although all types of content may be transmitted over a single stream (multiplexed), it is of course possible that each type of content is transmitted over its own stream or, indeed, network (e.g., wired and wireless).

In accordance with the SVCS architecture, a Receiver can compose the decoded video streams (as well as any content streams) received from the Server(s) on its display, and also mix and play back the decoded audio streams. It is noted that traditional multi-point video servers such as transcoding MCUs can perform this function on the server itself, either once for all receiving participants, or separately for each receiving participant.

The operation of the Servers 210 and 220 is further detailed in FIG. 3. FIG. 3 depicts an example system 300 that includes three transmitting participants Sender 1 331, Sender 2 332, and Sender 3 333, a Server (SVCS) 320, and a Receiver 310. The particular configuration is just an example; a Receiver can be a Sender at the same time and vice versa. Furthermore, there may be more or fewer Senders, Receivers, or Servers.

In one embodiment of the disclosed subject matter, scalable coding is used for the video, content, and audio signals. The video and content signals are coded using H.264 SVC with three layers of temporal scalability and two layers of spatial scalability, with a ratio of 2 between the horizontal or vertical picture dimensions between the base and enhancement layers (e.g., VGA and QVGA).

Each of the Senders 331, 332, and 333 can be connected to the Server 320 through which it can transmit one or more media streams—audio, video, or content. Each Sender 331, 332, and 333 also can have a signaling connection with the Server 320 (labeled 'SIG'). The streams in each connection are labeled according to: 1) the type of signal, A for audio, V for video, and C for content; and 2) the layers present in each stream, B for base and E for enhancement. In this particular example, the streams transmitted from Sender 1 331 to Server 320 include an audio stream with both base and enhancement layers ("A/B+E") and a video stream with again both base and enhancement layers ("V/B+E"). For Sender 3 333, the streams include audio and video with base layer only ("AM" and "V/B"), as well as a stream with content with both base and enhancement layers ("C/B+E").

The Server 320 can be connected to the Receiver 310 through which packets of the different layers from the different streams that can be received by the Server 320 are selectively forwarded to the Receiver 310. Although there may be a single connection between the Server 320 and the Receiver 310, those skilled in the art will recognize that different streams could be transmitted over different connections (including different types of networks). In addition, there need not be a direct connection between such elements (intervening elements may be present).

FIG. 3 shows three different sets of streams (301, 302, 303) transmitted from Server 320 to Receiver 310. In an exemplary embodiment, each set corresponds to the subset of layers and/or media that the Server 320 forwards to Receiver 310 from a corresponding Sender, and is labeled with the number of each sender. For example, the set 301 can contain layers from Sender 1 331, and is labeled with the number 1. The label also includes the particular layers that are present (or a dash for content that is not present at all). As an example, the set 301 is labeled as "1:A/B+E, V/B+E" to indicate that these are streams from Sender 1 331, and that both base and enhancement layers are included for both video and audio. Similarly, the set 303 is labeled "3:A/–, V/B, C/B+E" to indicate that this is content from Sender 3 333, and that there is no audio, only base layer for video, and both base and enhancement layer for content.

With continued reference to FIG. 3, each of the Senders 331, 332, 333 can transmit zero or more media (video, audio, content) to the Server 320 using a combination of base or base plus enhancement layers. The particular choice of layers and media depends on several factors. For example, if a Sender is not an active speaker then it may be best if no audio is transmitted by it. Similarly, if a participant is shown at low resolution then it may not be necessary to transmit the spatial enhancement layer of that particular participant. Network bitrate availability may also dictate particular layer and media combination choices. These, and other criteria, can also be used by the Server 320 in order to decide which packets (corresponding to layers of particular media) to selectively forward to Receiver 320. These criteria can be communicated between Receiver 310 and the Server 320, or between the Server 320 and one of the Senders 331, 332, 333, through appropriate signaling ("SIG" in FIG. 3) channels (e.g., 304).

The spatiotemporal picture prediction structure in one embodiment of the disclosed subject matter is shown in FIG. 4. The letter "B" designates a base layer picture whereas the letter "S" designates a spatial enhancement layer picture. The number next to the letter indicates the temporal layer, 0 through 2. Other scalability structure can also be used, including for example extreme cases such as simulcasting (where no interlayer prediction is used). Similarly, the audio signal is coded with two layers of scalability, narrowband (base) and wideband (enhancement). Although scalable coding is assumed in some embodiments, the disclosed subject matter can be used in any videoconferencing system, including legacy ones that use single-layer coding.

FIG. 5 shows how the different layers present in the spatiotemporal picture prediction structure of FIG. 4 may be handled by an SVCS in an exemplary embodiment. FIG. 5 shows a scalable video stream that has the spatiotemporal picture prediction structure 510 of FIG. 4 being transmitted to an SVCS 590. The SVCS 590 may be connected to three different endpoints (not shown). The three endpoints may have different requirements in terms of the picture resolution and frame rate that they can handle, and may be differentiated in a high resolution/high frame rate 520, high resolution/low frame rate 530, and low resolution/high frame rate 540 configuration. FIG. 5 shows that for the high resolution/high frame rate endpoint the system transmits all layers; the structure may be identical to the one provided at the input of the SVC 590. For the high resolution/low frame rate configuration 530, the SVCS 590 has removed the temporal layer 2 pictures (B2 and S2). Finally, for the low resolution/high frame rate configuration 540, the SVCS 590 has removed all the "S" layers (S0, S1, and S2). This is merely an example, and of course different configurations and different selection criteria are possible.

As mentioned earlier, the SVCS system architecture is inherently multi-stream, since each system component has to be able to handle multiple streams of each type. Significantly, the actual composition of video and mixing of audio typically occurs at the receivers. With reference to FIG. 3, the composition of video and content can occur at the Receiver 310. The figure depicts a single Display 312 attached to the Receiver 310. In this particular example, the system composes the incoming video and content streams using a "preferred view" layout in which the content stream from Sender 3 333 is shown in a larger window (labeled "3:C/B+E" to indicate that it is content from Sender 3 and includes both base and enhancement layers), whereas the video streams from all three senders (1, 2, and 3) are shown in smaller windows labeled "1:V/B", "2:V/B", "3:V/B", indicating that only the base layer is used.

The particular layout is just an example. In a two-monitor system, for example, the Receiver 310 could display the content stream in one of its two monitors on its own, with the video windows shown in the other monitor. Commonly assigned International Patent Application No. PCT/US09/36701, "System and method for improved view layout management in scalable video and audio communication systems," incorporated herein by reference in its entirety, describes additional systems and methods for layout management. Previously cited International Patent Application No. PCT/US11/038003, "Systems and Methods for Scalable Video Communication using Multiple Cameras and Multiple Monitors," describes additional layout management techniques specifically addressing multi-monitor, multi-camera systems.

We now describe an exemplary embodiment of the process for performing content sharing. Specifically, we describe an exemplary system that includes the ability to perform content sharing by allowing endpoint software that runs on personal computers to share one or more of the application windows.

FIG. 6 illustrates the process of content sharing in one embodiment. Assume that a user is part of a videoconference with four participants. An exemplary user interface of a software implementing an endpoint is shown in FIG. 6(a). Notice that four video windows are shown, one for each participant. We assume now that one of the participants initiates sharing of an application window, i.e., the window of an application that is currently running on his or her computer. This can be accomplished by pressing the "Share" selection button indicated by the arrow in FIG. 6(b). The button can act as a drop-down menu (not shown in the figure), listing all the currently available windows as reported by the operating system of the host computer. When one of these windows is selected for sharing, the sharing can be activated and the button can turn from gray to green, to indicate that sharing is active.

When the share is activated, all participants can start receiving an additional content window displaying the shared content. This is shown in FIG. 6(b) where, in addition to five participants, a sixth window is present in the lower center position showing an application window. From a system-level point of view, the transmission of this content through the system is no different than audio or video, although of course the details of its resolution, frame rate, as well as encoding and decoding processes, can be different. We observe that the content window may be too small to view characters and other small size features. The exemplary interface can allow the user to double-click the content view so that it "pops-out" into its own separate window as shown in FIG. 6(c). Here the content view is in its own window, and can thus be separately resized at will, whereas the main videoconferencing application window only shows the five video views.

Since users may simultaneously share application windows, and a user may actually share more than one window, a mechanism can be provided to select which share a user wants to see. This can be performed in an exemplary system via the "Toggle" button, as shown in FIG. 6(d). When pressed, the button can display a drop-down menu with a list of available shares, including the name of the user who is making the share available. The top-most entry can be for "None", indicating that no share window should be shown.

The present disclosure may be referred to as "grab and draw" for reasons that will become apparent from the description of the interaction details of the various embodiments.

The system is designed to provide the following key features, among others:

i) follow what people do in in-person meetings by allowing dynamic interaction with shared content;

ii) be interoperable with a desktop videoconferencing solution;

iii) be interoperable with legacy systems (possibly through a gateway device).

In one embodiment of the disclosed subject matter, the collaboration system can use a touch-screen All-In-One (AIO) personal computer that runs a content sharing only videoconferencing client (i.e., without a camera or microphone connected). The touch screen display can act as a white board. During normal operation it can show the data share of the conference, in the normal way that the videoconferencing software does. As explained earlier, this can be accomplished by encoding, at the originating participant, a window of the computer's screen, and distributing to all other participants as with regular video streams. In another embodiment of the present disclosure, the content sharing window may originate from an H.239 client, or any other visual communication protocol. It is also possible that the image shown on the touch screen is a regular video stream showing one or more of the participants.

The touch screen in the present disclosure, however, allows a user to actually walk up and touch the screen, thus "grabbing" the image. When doing so, the system will take a snapshot of the content currently displayed on the share window, and create a new share. In one embodiment of the present disclosure the new share is shown in a window that features a whiteboard application, through which the user can annotate the snapshot image. In one embodiment of the present disclosure whiteboard annotation can involve selecting different colors from a palette, drawing on the snapshot, or clearing all annotation.

The snapshot image with which the whiteboard interaction starts is the image previously shared by the other party. The whiteboard image, including any annotation, is shared with other session participants as any other window share.

Notice that, in the above exemplary embodiment of the present disclosure, the whiteboard application does not operate in a distributed way: only the user who performed the "grab" is annotating the image on the whiteboard. Furthermore, all other participants receive the annotated image from the whiteboard as they do any other share. In other words, they do not need any special or additional software and, in fact, even systems that are not equipped with the improved content sharing capability can display the annotated whiteboard without problems (backwards compatibility).

Other users that receive the whiteboard image and are equipped with the "grab and draw" improved content sharing capability will be able themselves to "grab" the image, and add content on their own.

In some embodiments of the present disclosure the "grabbing" operation can be performed via a touch screen, whereas in others it can be performed via a suitable pointing device such as a mouse. Other user interface control devices can be used as is apparent to those skilled in the art, including tablets, touchpads, 3D pointing devices, etc.

The present disclosure has the benefit that existing components of a video communication system are not impacted by the improved content sharing capability. The design thus offers backwards compatibility with existing systems.

Contrary to distributed solutions, in the present disclosure the application does not need to send remote mouse and keyboard commands to remote applications. Such applications tend to be non-interactive (due to high latency) and cumbersome to use. In the present disclosure the drawing operation on the whiteboard application is performed locally.

In some embodiments of the present disclosure the device on which the drawing is performed may not be the same device where the rest of the video communication occurs. This would be the case in a multicamera/multimonitor system that features a Control Unit and one or more Node Units as described in previously cited commonly assigned International Patent Application No. PCT/US11/038003. The improved interactive content sharing application can be a Node Unit equipped with a suitable pointing device such as a mouse, or a built-in pointing device such as a touch screen. Control Units and Node Units are described in more detail later on.

In some embodiments of the present disclosure endpoints can be modified to enable a "forced sharing" on all endpoints once a user "grabs" an image. In this case all users are forced to view the particular share, as instructed by appropriate signaling that originates from the content sharing endpoint, through the server(s), to the receiving endpoint(s).

In some embodiments of the present disclosure the "grab and draw" concept can be applied such that the trigger ("grab") is a user gesture other than clicking a "Grab" button. For example, a camera can be focused on a whiteboard area and, when someone is detected to write on the whiteboard, the system can perform video switching into that camera so that its content is selected for transmission to other participants. In this case the "grab" action is the presence of a user in front of the whiteboard.

We now describe an embodiment of the present disclosure that is based on the multimonitor/multicamera architecture disclosed in International Patent No. PCT/US11/038003 (previously cited)". Operation in simpler architectures with one or two monitors and a small number of cameras can be performed in the same or similar way, by integrating functions into a single system component, as will be apparent to people skilled in the art.

In this embodiment of the present disclosure it is assumed that scalable video (and optionally audio) coding is used, following the H.264 SVC specification (previously cited). For audio it is assumed that Speex audio coding is used.

The present disclosure does not require that video encoding is scalable. As will be apparent to persons skilled in the art, any video or audio encoding technique may be used, including single-layer, simulcast, or even multiple description coding. The use of an SVCS makes the handling of individual streams in an endpoint much simpler.

FIG. 7 depicts the structure of an endpoint 700 equipped with interactive content sharing in accordance with some embodiments of the disclosed subject matter. The figure shows an endpoint 700 comprised of a Control Unit 770 and a set of Nodes 750 and 760. An endpoint can include any number of Nodes; in the figure N Nodes are shown. The N-th node is shown to be a special type of node called "Content Sharing Node," in accordance with the principles of the present disclosure. A single such Node is shown for purposes of illustration; any number of nodes may actually be Content Sharing Nodes. Each Node 750 consists of a Node Unit 755, which can be connected to a monitor 720, optionally a camera 710, and optionally to an audio device 730 (microphone, speaker, or a combination of the two, in either mono or stereo). These are referred to as 'peripheral devices' in the following. The Node Units 750 and 760 can be connected to the Control Unit 770 which is the operational control center of the endpoint 700. The Control Unit can communicate with SVCS and management servers such as a Portal. The endpoint 700 can also have a Control Panel 780 that communicates with the Control Unit 770 and allows the operator to make system selections or settings. The Control Panel 780 may be, for example, an application running on an Apple iPad device.

Node 760 is shown as a special node in that it includes a touch screen 766 instead of a regular monitor 720. The touch screen 766 is connected both via a video connection 764 with its Node Unit but it also has a second connection 762 that provides information about the touch screen status. The second connection 762 may be a USB connection or a Bluetooth connection, or any other suitable connection. In some embodiments of the present disclosure the Content Sharing Node unit can have a regular monitor (such as monitor 720) and be equipped with a pointing device such as a mouse. Alternative mechanisms for obtaining user interaction are also possible, as is apparent to persons skilled in the art.

The endpoint 700 participates in video communication sessions like a regular endpoint, as described also in International Patent Application No. PCT/US11/038003 (previously cited). The touch screen 766 allows the user to touch a point on the screen (e.g., a "grab" button) and thus instruct the system to "grab" a snapshot of the image currently shown on the screen. The image automatically becomes content that the Node Unit 765 associated with the Content Sharing Node 760 begins to share with other participants, as with any other shared content. In one embodiment of the present disclosure the Node Unit 765 also runs software that allows the user to select drawing colors and then draw lines on the "grabbed" content. The software running on the Node Unit 765 may also include a "clear" button to clear all annotations and reset the drawing process. As explained in International Patent Application No. PCT/US11/038003 (previously cited), the Node Units may actually be integrated with the Control Unit of the Endpoint in a single device.

The operation of the endpoint 700 in the context of a complete system is depicted in FIG. 8. The figure shows an exemplary SVCS 810 that interconnects a number of different types of endpoints. Although a single SVCS 810 is shown, it is noted that, in general, more than one SVCS can be associated with a connection since cascading can be used among SVCSs (i.e., more than one SVCS can be in the path from one endpoint to another). Cascading of SVCS is compatible with the disclosed subject matter.

With continued reference to FIG. 8, the figure shows an Endpoint 1 820 that is equipped with a Content Sharing Node Unit 820co. There is also an Endpoint 2 822 that features multiple cameras and multiple monitors. There is also a Room System 824 endpoint, which can be a typical single encoder videoconferencing, and a Desktop 826 endpoint which is an endpoint implemented in software and running on a general purpose computer. Finally, there is a Gateway 828 device which is used to interconnect a Legacy System 880 that may not support the operations of the SVCS.

The Legacy System 880 can be a room system, desktop software system, or, in fact, a legacy MCU. The Gateway 828 behaves as a regular SVC endpoint on its SVC connection, and as a legacy endpoint on its legacy connection; it performs transcoding of audio and video as appropriate, and also uses the appropriate signaling on each of its sides. For example, it can use H.323 to communicate with the Legacy System 880 and another protocol, possibly proprietary, to communicate to the SVCS 810, and transcode between H.264 SVC and H.263 for video, and between Speex and G.722 for audio.

The particular selection of endpoints and gateways is only used for purposes of illustration; any number of endpoints can be used, as well as any number of legacy endpoints or gateways, as is apparent to persons skilled in the art.

In one embodiment of the present disclosure, the operation of the "Grab and Draw" operation in the system shown in FIG. 8 is as follows. The user (or one of the users) operating Endpoint 1 820 proceeds to Content Sharing Node Unit 820co and touches a button the touch screen attached to Content Sharing Node Unit 820co. The image that is shown in the screen is "grabbed" or captured, and it automatically becomes a content share originating from Endpoint 1 820. The user is shown additional graphical user interface elements that allow drawing on the touch screen. The effect of such drawing on the captured picture is transmitted to all other participants, as would any other visual update on shared content. The operation is similar to sharing a Microsoft Word window—any changes performed by Word on the window are sent (rather, encoded images of the window are sent) to other users.

The content share can be transmitted by the Endpoint 1 820 to other participants via the SVCS 810. Participants that are compatible with the SVC/SVCS architecture can directly display the shared content. Other endpoints, such as Legacy System 880 can receive such content via the Gateway 828. The Gateway 828 can offer such content as an additional video participant, or it can use protocols such as H.239 to indicate that the stream corresponds to shared content.

The process of grabbing, drawing, and sharing in accordance with one embodiment of the present disclosure is further illustrated in FIG. 9. FIG. 9(a) shows a touch screen Monitor 910 that displays shared content 920 from some participant. The user interface shown to the user includes a Grab Button 925. When the user clicks the Grab Button 925 (directly through the touch screen interface or through some other suitable pointing device) the currently displayed image is "grabbed" or captured, and is displayed statically (without being driven by the remote participant that was originally sharing the content). The user interface then removes the Grab Button 925 and, as shown in FIG. 9(*b*), displays instead a cursor 935, color selection buttons 930, and a clear button 932 (labeled "CLR"). The user interface then allows the user to draw on the screen. FIG. 9(*c*) shows an example, where the user has drawn an ellipse annotation 940, supposedly highlighting some feature of the graph that is shown on the monitor. Note that remote users see only the captured ("grabbed") image as well as any annotation that may be drawn, as shown in FIG. 9(*d*). In other words, the user interface elements are only shown to the user who is performing the annotation.

The methods for scalable video communication using multiple cameras and multiple monitors described above can be implemented as computer software using computer-readable instructions and physically stored in computer-readable medium. The computer software can be encoded using any suitable computer languages. The software instructions can be executed on various types of computers. For example, FIG. 10 illustrates a computer system 1000 suitable for implementing embodiments of the present disclosure.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 1000 can have many physical forms including an integrated circuit, a printed circuit board, a small handheld device (such as a mobile telephone or PDA), a personal computer or a super computer.

Computer system 1000 includes a display 1032, one or more input devices 1033 (e.g., keypad, keyboard, mouse, stylus, etc.), one or more output devices 1034 (e.g., speaker), one or more storage devices 1035, various types of storage medium 1036.

The system bus 1040 link a wide variety of subsystems. As understood by those skilled in the art, a "bus" refers to a plurality of digital signal lines serving a common function. The system bus 1040 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 1001 (also referred to as central processing units, or CPUs) optionally contain a cache memory unit 1002 for temporary local storage of instructions, data, or computer addresses. Processor(s) 1001 are coupled to storage devices including memory 1003. Memory 1003 includes random access memory (RAM) 1004 and read-only memory (ROM) 1005. As is well known in the art, ROM 1005 acts to transfer data and instructions uni-directionally to the processor(s) 1001, and RAM 1004 is used typically to transfer data and instructions in a bi-directional manner. Both of these types of memories can include any suitable of the computer-readable media described below.

A fixed storage 1008 is also coupled bi-directionally to the processor(s) 1001, optionally via a storage control unit 1007. It provides additional data storage capacity and can also include any of the computer-readable media described below. Storage 1008 can be used to store operating system 1009, EXECs 1010, application programs 1012, data 1011 and the like and is typically a secondary storage medium (such as a hard disk) that is slower than primary storage. It should be appreciated that the information retained within storage 1008, can, in appropriate cases, be incorporated in standard fashion as virtual memory in memory 1003.

Processor(s) 1001 is also coupled to a variety of interfaces such as graphics control 1021, video interface 1022, input interface 1023, output interface 1024, storage interface 1025, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 1001 can be coupled to another computer or telecommunications network 1030 using network interface 1020. With such a network interface 1020, it is contemplated that the CPU 1001 might receive information from the network 1030, or might output information to the network in the course of performing the above-described method. Furthermore, method embodiments of the present disclosure can execute solely upon CPU 1001 or can execute over a network 1030 such as the Internet in conjunction with a remote CPU 1001 that shares a portion of the processing.

According to various embodiments, when in a network environment, i.e., when computer system 1000 is connected to network 1030, computer system 1000 can communicate with other devices that are also connected to network 1030. Communications can be sent to and from computer system 1000 via network interface 1020. For example, incoming communications, such as a request or a response from another device, in the form of one or more packets, can be received from network 1030 at network interface 1020 and stored in selected sections in memory 1003 for processing. Outgoing communications, such as a request or a response to another device, again in the form of one or more packets, can also be stored in selected sections in memory 1003 and sent out to network 1030 at network interface 1020. Processor(s) 1001 can access these communication packets stored in memory 1003 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 1000 can provide functionality as a result of processor(s) 1001 executing software embodied in one or more tangible, computer-readable media, such as memory 1003. The software implementing various embodiments of the present disclosure can be stored in memory 1003 and executed by processor(s) 1001. A computer-readable medium can include one or more memory devices, according to particular needs. Memory 1003 can read the software from one or more other computer-readable media, such as mass storage device(s) 1035 or from one or more other sources via communication interface. The software can cause processor(s) 1001 to execute particular processes or particular parts of particular processes described herein, including defining data structures stored in memory 1003 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosed subject matter. It will thus be appreciated that those skilled in the art will be able to devise numerous systems and methods which, although not explicitly shown or described herein, embody the principles of the disclosed subject matter and are thus within its spirit and scope.

What is claimed is:

1. A system for interactively sharing and annotating visual information over a communication network between at least a first and a second endpoint, the system comprising:
    a display coupled to the first endpoint; and
    a user interaction device coupled to the first endpoint and associated with the display;
    wherein the first endpoint is configured to:
        receive visual information from, and transmit visual information to, at least the second endpoint over the communication network;
        show visual information received from at least the second endpoint on the display;
        obtain a picture copy of the visual information received from at least the second endpoint as shown on the display when instructed by the user interaction device;
        add an annotation as indicated by the user interaction device to the picture copy of the visual information to form an annotated picture copy of the visual information; and
        transmit the annotated picture copy of the visual information to at least the second endpoint.

2. The system of claim 1 wherein the user interaction device comprises a human location detection device.

3. The system of claim 1 wherein the visual information is encoded in a compressed digital video format.

4. The system of claim 1 further comprising a server coupled to the communications network through which the first endpoint and second endpoint communicate with each other.

5. The system of claim 1 wherein the first endpoint is further configured to send a message to the second endpoint to display the transmitted annotated copy of the visual information.

6. A method for interactively sharing and annotating visual information over a communication network, the method comprising the steps of:
    at a first endpoint, receiving visual information from, or transmitting visual information to, a second endpoint over the communication network;
    at the first endpoint, displaying visual information received from the second endpoint;
    after receiving an instruction by a user interaction device coupled with the first endpoint,
        obtaining a picture copy of the visual information received from at least the second endpoint as displayed,
        adding an annotation as indicated by the user interaction device to the picture copy of the visual information to form an annotated picture copy of the visual information, and
        transmitting the annotated picture copy of the visual information to the second endpoint.

7. The method of claim 6 further comprising detecting the location of a human by the user interaction device.

8. The method of claim 6 further comprising compressing the visual information in a digital video coding format.

9. The method of claim 6, wherein the visual information received from, or transmitted to, the second endpoint passes through a server.

10. A non-transitory computer-readable medium comprising a set of instructions to direct a processor to perform the methods of one of claims 6 to 9.

* * * * *